US012741686B2

(12) United States Patent
Hu et al.

(10) Patent No.: US 12,741,686 B2
(45) Date of Patent: Sep. 22, 2026

(54) HOD DEVICE AND VEHICLE CONTROL DEVICE

(71) Applicant: PixArt Imaging Inc., Hsin-Chu City (TW)

(72) Inventors: Chin-Hua Hu, Hsin-Chu City (TW); Ching-Shun Chen, Hsin-Chu City (TW); Yu-Han Chen, Hsin-Chu City (TW); Yu-Sheng Lin, Hsin-Chu City (TW)

(73) Assignee: PixArt Imaging Inc., Hsin-Chu City (TW)

(*) Notice: Subject to any disclaimer, the term of this patent is extended or adjusted under 35 U.S.C. 154(b) by 227 days.

(21) Appl. No.: 17/949,232

(22) Filed: Sep. 21, 2022

(65) Prior Publication Data

US 2024/0092415 A1 Mar. 21, 2024

(51) Int. Cl.

*B62D 1/04* (2006.01)
*B62D 1/06* (2006.01)
*G01D 5/24* (2006.01)

(52) U.S. Cl.

CPC ............... *B62D 1/046* (2013.01); *B62D 1/06* (2013.01); *G01D 5/24* (2013.01)

(58) Field of Classification Search

CPC ............. B62D 1/046; B62D 1/06; G01D 5/24
See application file for complete search history.

(56) References Cited

U.S. PATENT DOCUMENTS 7,928,341 B2 4/2011 Ito
8,487,898 B2 7/2013 Hotelling
9,588,625 B2 * 3/2017 Poupyrev ............ G06F 3/04883
10,082,913 B2 * 9/2018 Moller .................. G06F 3/0446
10,282,026 B2 5/2019 Krah
10,969,248 B2 * 4/2021 Lakatos ................. B60N 2/003
11,220,284 B2 * 1/2022 Hyoudou ............... B62D 1/065
11,613,293 B2 * 3/2023 Sabourin ................ G01V 13/00 324/601
12,007,258 B2 * 6/2024 Chen ......................... B32B 5/02
12,013,302 B2 * 6/2024 Porte ....................... G01L 5/221
2004/0262805 A1 * 12/2004 Bostick ................. B29C 33/424 264/219

(Continued)

FOREIGN PATENT DOCUMENTS

CN 105183221 12/2015
CN 105335737 2/2016

(Continued)

*Primary Examiner* — Reena Aurora

(74) *Attorney, Agent, or Firm* — Winston Hsu

(57) ABSTRACT

An HOD device, comprising: a framework; covering material, covering the frame work; at least one conductive region, provided on or in the covering material; wherein the conductive region is coupled to a capacitance detection circuit or a predetermined voltage level. The HOD device can be a vehicle control device such as a steering wheel. The conductive region comprises conductive wires which can be threads of the covering material. By this way, the arrangements of the conductive wires can be changed corresponding to the size or the shape of the frame work or any other requirements. Also, the interference caused by unstable factors can be improved since the conductive wires can be coupled to a ground source of the vehicle to provide a short capacitance sensing path.

13 Claims, 8 Drawing Sheets

(56) References Cited

U.S. PATENT DOCUMENTS

| | | | | |
|---|---|---|---|---|
| 2010/0007631 | A1* | 1/2010 | Chang | G06F 3/0446 345/173 |
| 2013/0305974 | A1* | 11/2013 | Ishii | D05B 23/00 112/475.08 |
| 2014/0253151 | A1* | 9/2014 | Kandler | G01L 1/26 324/686 |
| 2015/0048845 | A1 | 2/2015 | Petereit | |
| 2024/0090175 | A1* | 3/2024 | Sasaki | H05K 7/205 |

FOREIGN PATENT DOCUMENTS

| | | | | |
|---|---|---|---|---|
| CN | 107111411 | A | | 8/2017 |
| CN | 111315631 | A | | 6/2020 |
| CN | 212074191 | U | | 12/2020 |
| DE | 102009058138 | | * | 6/2011 |
| FR | 1.603.292 | A | | 3/1971 |

* cited by examiner

HOD DEVICE AND VEHICLE CONTROL DEVICE

BACKGROUND OF THE INVENTION

1. Field of the Invention

The present invention relates to a HOD (Hand Off Detection) device and a vehicle control device, and particularly relates to a HOD device and a vehicle control device, which use a thread of covering material as a sensing line or a ground line.

2. Description of the Prior Art

A conventional steering wheel may have a HOD function, which can prevent the driver from falling asleep or improving driving behavior while driving or assisting the driver in autopilot. However, steering wheels for different brands may have different sizes and structures, thus it is hard to design a general purpose HOD device.

Also, a conventional steering wheel always has sensing lines for capacitance sensing. However, for such structure, the capacitance sensing path may contain a long path which is from the user's hand touching the HOD device, through his body, to his feet. For such case, the capacitance sensing of the steering wheel may be interfered by many unstable factors. For example, the kind of shoes which the user wears, and the kind of floor mat which the user is stepping on.

SUMMARY OF THE INVENTION

One objective of the present invention is to provide an HOD device which can meet different design requirements.

Another objective of the present invention is to provide a vehicle control device which can meet different design requirements.

Still another objective of the present invention is to provide an HOD device which can provide a short capacitance sensing path.

Still another objective of the present invention is to provide a vehicle control device which can provide a short capacitance sensing path.

One embodiment of the present invention provides an HOD device, comprising: a framework; covering material, covering the frame work; at least one conductive region, provided on or in the covering material; wherein the conductive region is coupled to a capacitance detection circuit or a predetermined voltage level.

Another embodiment of the present invention provides a vehicle control device, applied to a vehicle, comprising: a framework; covering material, covering the frame work; at least one conductive region, provided on or in the covering material; wherein the conductive region is coupled to a capacitance detection circuit or a ground source of the vehicle.

The above mentioned HOD device and the vehicle control device can be steering wheels. Also, the conductive region can comprise conductive wires, which can be implemented by threads of the covering material.

In view of above-mentioned embodiments, the arrangements of the conductive wires can be changed corresponding to the size or the shape of the frame work or any other requirements. Besides, the interference caused by unstable factors can be improved since the conductive wires can be coupled to a ground source of the vehicle to provide a short capacitance sensing path.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. The term “first”, “second”, “third” in following descriptions are only for the purpose of distinguishing different one elements, and do not mean the sequence of the elements. For example, a first device and a second device only mean these devices can have the same structure but are different devices. Besides, in following embodiments, a steering wheel is used as an example for explaining, but the concept disclosed by the present invention can be applied to any other device. For example, the concept disclosed by the present invention can be applied to a vehicle control device such as a gear lever of a car or a handgrip of a motorcycle.

Figure 1:
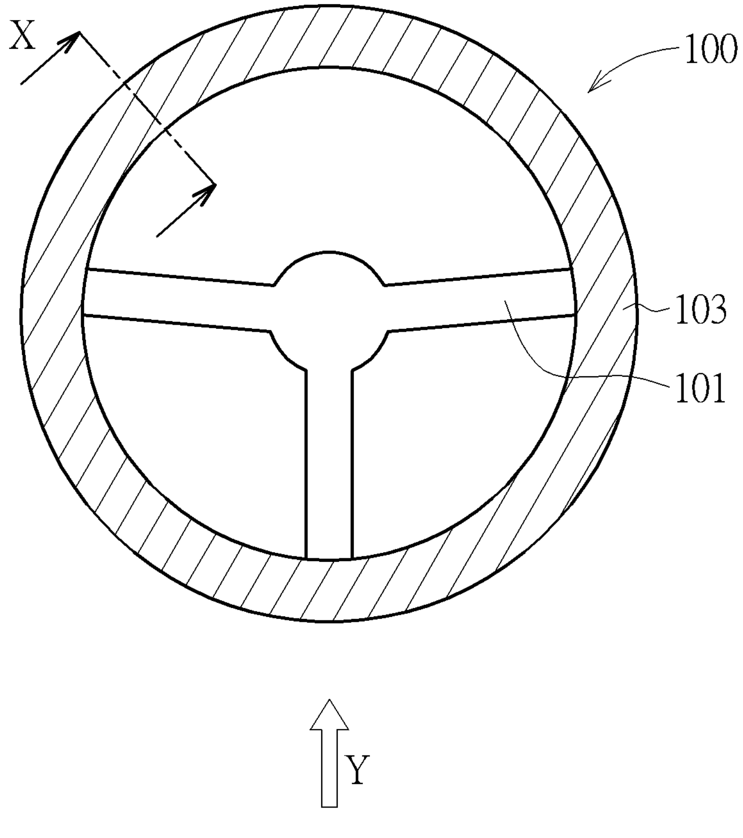
FIG. 1, FIG. 2 and FIG. 3 are schematic diagrams illustrating a steering wheel according to one embodiment of the present invention.
Figure 1:
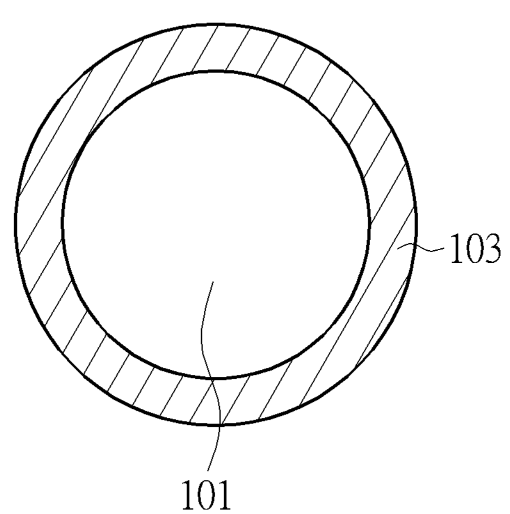
Figure 2:
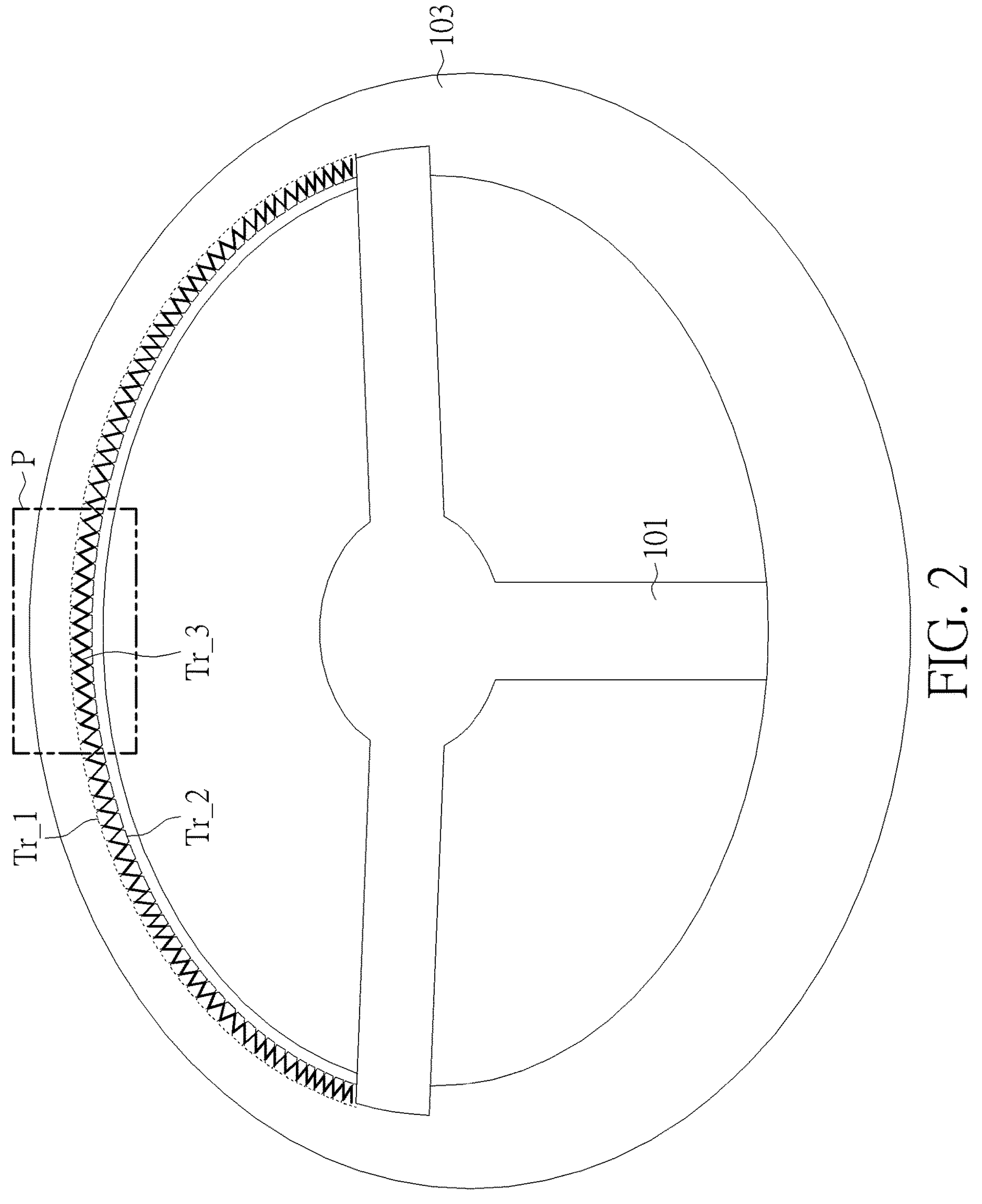
Figure 3:
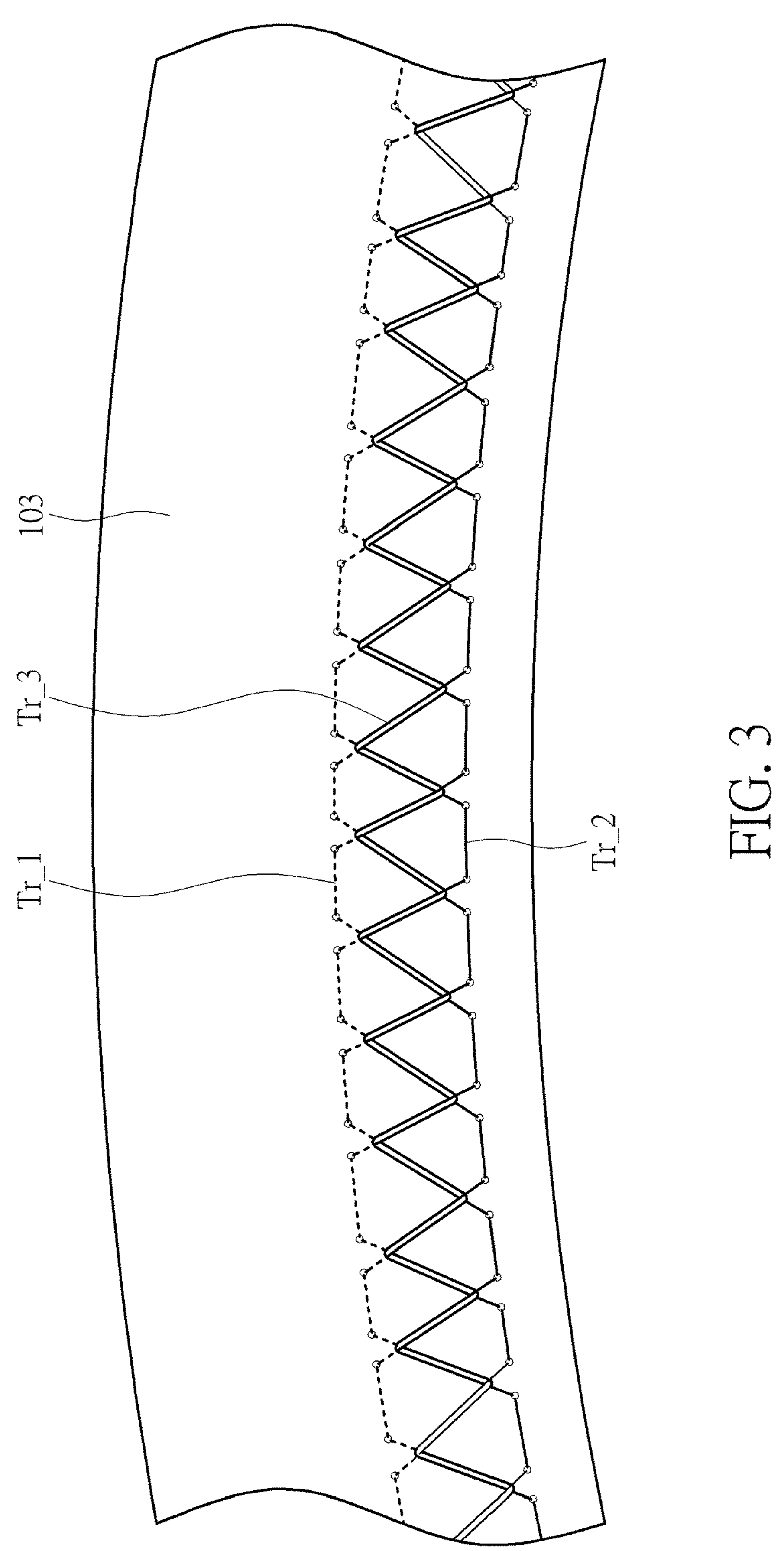

FIG. 1, FIG. 2 and FIG. 3 are schematic diagrams illustrating a steering wheel according to one embodiment of the present invention. In the upper diagram in FIG. 1, the steering wheel 100 comprises a frame work 101 and covering material 103. The lower diagram in FIG. 1 is a cross sectional diagram of the upper diagram in FIG. 1 following the X direction. As illustrated in the cross sectional diagram, the covering material 103 is covering (surrounding) the frame work 101. The covering material 103 can be made by extendable material, like leather, carbon fiber or any other required material.

Also, the steering wheel 100 further comprises at least one conductive region provided on or in the covering material 103. In one embodiment, the conductive region is coupled to a capacitance detection circuit or a predetermined voltage level (e.g. grounding source). Details of the conductive region will be described later. Please note, the description “the conductive region is provided on the covering material 103” means the conductive region majorly (e.g. over 80% or 90%) exposes on the covering material 103. Additionally, the description “the conductive region is provided in the covering material 103” means the conductive region is totally or partially covered by the covering material 103. In following embodiments, the conductive region is provided in the covering material 103.

Please refer to FIG. 2, which illustrates a diagram of the upper diagram in FIG. 1 viewed in the Y direction. In the embodiment of FIG. 2, the conductive region is formed by at least one conductive wire. The conductive wire is made from conductive material, such as but not limited to metal, graphene, or electroconductive fiber. In one embodiment, the conductive wires are threads of the covering material 103, such as the first thread Tr_1, the second thread Tr_2 and the third thread Tr_3 in FIG. 2 and FIG. 3. The threads are used for stitching the covering material 103 such that the covering material 103 can be fixed and surrounding the frame work 101.

FIG. 3 is an enlarged diagram of the region P in FIG. 2. It will be appreciated that the shape, the location and the number of the first thread Tr_1, the second thread Tr_2 and the third thread Tr_3 are not limited to the examples illustrated in FIG. 2 and FIG. 3. As shown in FIG. 3, the first thread Tr_1 and the second thread Tr_2 are at different sides of the third thread Tr_3, and the first thread Tr_1, the second thread Tr_2 penetrate opposing sides of the covering material 103. Besides, the third thread Tr_3 is configured to hook the first thread Tr_1 and the second thread Tr_2 to stitch the covering material 103. At least one of the first thread Tr_1, the second thread Tr_2 and the third thread Tr_3 is made from conductive materials.

In one embodiment, the third thread Tr_3 is made from non-conductive material, and the first thread Tr_1 and the second thread Tr_2 are made from conductive materials and serve as the conductive regions. In such embodiment, the first thread Tr_1 and the second thread Tr_2 can be coupled to the predetermined voltage level. Also, in such embodiment, the first thread Tr_1 and the second thread Tr_2 can be coupled to a capacitance detection circuit. Further, one of the first thread Tr_1 and the second thread Tr_2 can be coupled to the predetermined voltage level, and the other one of the first thread Tr_1 and the second thread Tr_2 is coupled to the capacitance detection circuit. For example, the first thread Tr_1 is coupled to the predetermined voltage level, and the second thread Tr_2 is coupled to the capacitance detection circuit.

In another embodiment, the first thread Tr_1, the second thread Tr_2 and the third thread Tr_3 are all made from conductive materials and serve as the conductive regions. In such case, the first thread Tr_1, the second thread Tr_2 and the third thread Tr_3 are integrated as a single conductive wire and is coupled to the capacitance detection circuit or the predetermined voltage level.

In still another embodiment, the third thread Tr_3 is made from conductive materials, and the first thread Tr_1, the second thread Tr_2 are made from non-conductive materials. In such case, the third thread Tr_3 serves as the conductive wire and is coupled to the capacitance detection circuit or the predetermined voltage level.

In one embodiment, the covering material 103 is a whole piece of leather. Such leather is bended and the threads are used for stitching different sides of the leather (s), thereby the leather can surround the framework 101, as illustrated in the cross-sectional view illustrated in FIG. 1. In another embodiment, the covering material 103 comprise different pieces of leathers. For such case, the above-mentioned threads are used for stitching different pieces of the leathers.

Figure 4:
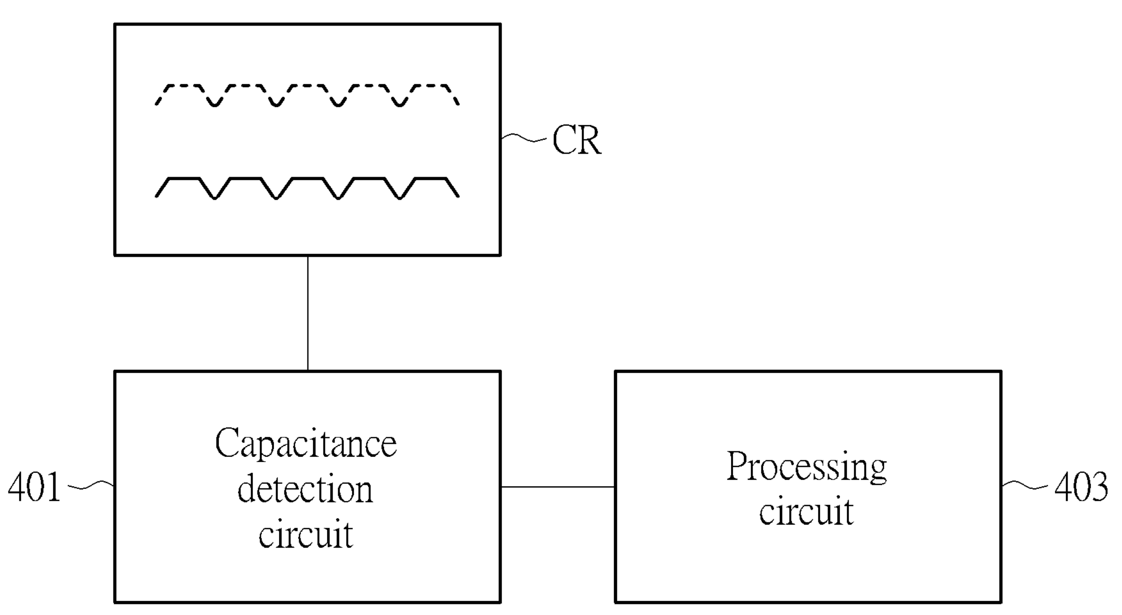
FIG. 4 is a block diagram illustrating that the conductive region is coupled to a capacitance detection circuit.

FIG. 4 is a block diagram illustrating that the conductive region is coupled to a HOD sensor, the HOD sensor includes a capacitance detection circuit 401 and a processing circuit 403. In such case, the conductive wire of the conductive region CR serves as a sensing line. In the embodiment of FIG. 4, the conductive region CR, which can comprise the above-mentioned conductive wires, is coupled to a capacitance detection circuit 401. The capacitance detection circuit 401 can detect the capacitance generated by the conductive region CR.

For more detail, the conductive region CR outputs a first capacitance if a user's hand touches the conductive region CR, and outputs a second capacitance if the user's hand does not touch the conductive region CR. In other words, the capacitance detection circuit 401 detects capacitance variation of the conductive region CR responding to a touch of a user to the conductive region CR. Therefore, the processing circuit 403 can determine whether the user touches the steering wheel 100 or not according to the capacitance output by the conductive region CR through the capacitance detection circuit 401. In one embodiment, capacitance variation of the conductive region CR only responds to a touch of a user to the conductive region CR but does not respond to other factors. For example, capacitance variation of the conductive region CR only responds to a touch of a user to the conductive region CR but does not respond a strength that the users hand press the steering wheel 100, does not respond to deformation of the covering material 103, and does not respond to a distance between the user's hand, which already touches the covering material 103, and the frame work 101.

The arrangements of the conductive wires can be set, corresponding to whether the conductive region CR is used for self-capacitance touch sensing or for mutual capacitance touch sensing. If the conductive wires are used for self-capacitance touch sensing, the conductive wires can serve as sensing lines. Also, if the conductive wires are used for mutual capacitance touch sensing, the conductive wires can serve as sensing lines or driving lines. Details about the self-capacitance touch sensing and the mutual capacitance touch sensing are well known by persons skilled in the art. For example, a US patent with a patent number of U.S. Pat. No. 9,684,418 clearly states the structures the self-capacitance touch sensing device and the mutual capacitance touch sensing device, thus descriptions thereof are omitted for brevity here.

Figure 5:
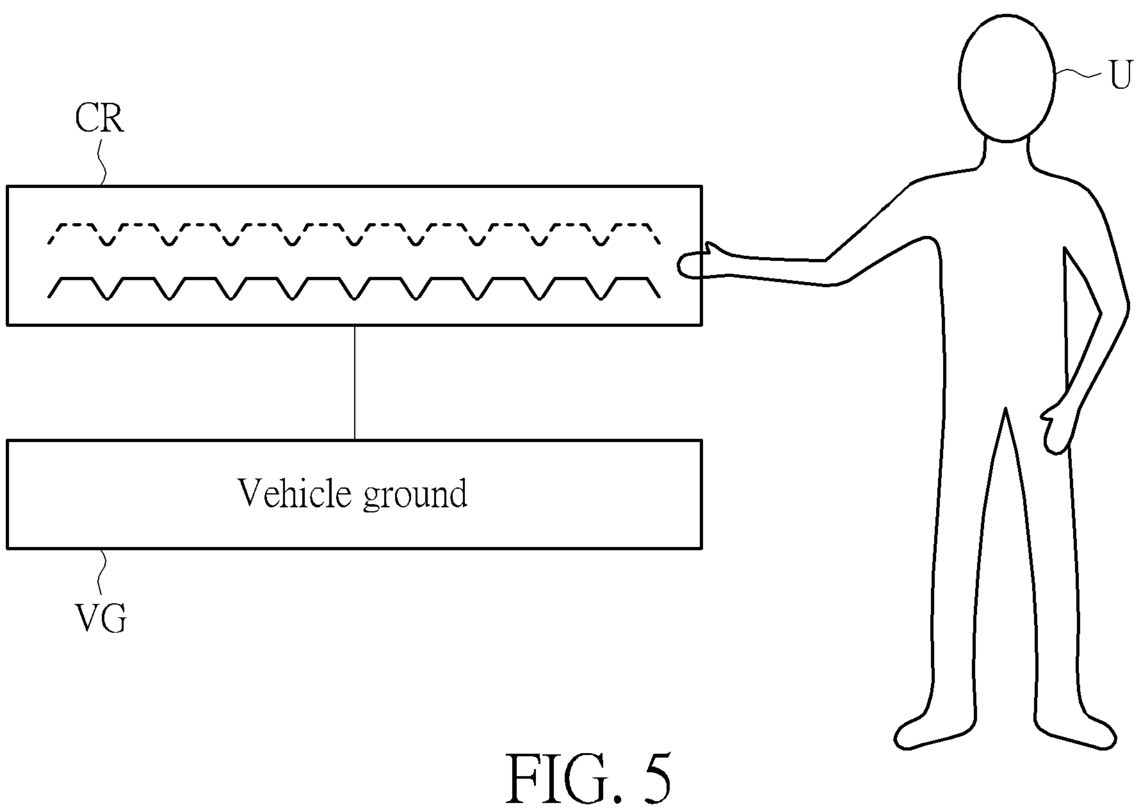
FIG. 5 is a block diagram illustrating that the conductive region is coupled to a predetermined voltage level.

FIG. 5 is a block diagram illustrating that the conductive region is coupled to a predetermined voltage level, which is a vehicle ground source VG in this embodiment. For example, if the steering wheel 100 is applied to a car, the predetermined voltage level is a ground source of the car. In such case, at least part of the conductive wires in the conductive region CR serve as ground lines. Via such mechanism, the capacitance sensing path does not pass through the user U even if the user U touches the conductive region CR, thus the issues illustrated in prior art can be improved. In other words, a better grounding effect is provided. In the embodiment of FIG. 5, a total area of the conductive region CR which is coupled to the ground source VG can be only portion of a total area of a surface of the covering material 103. For example, a total area of the conductive region CR which is coupled to the ground source VG is half of a total area of a surface of the covering material 103.

Figure 6:
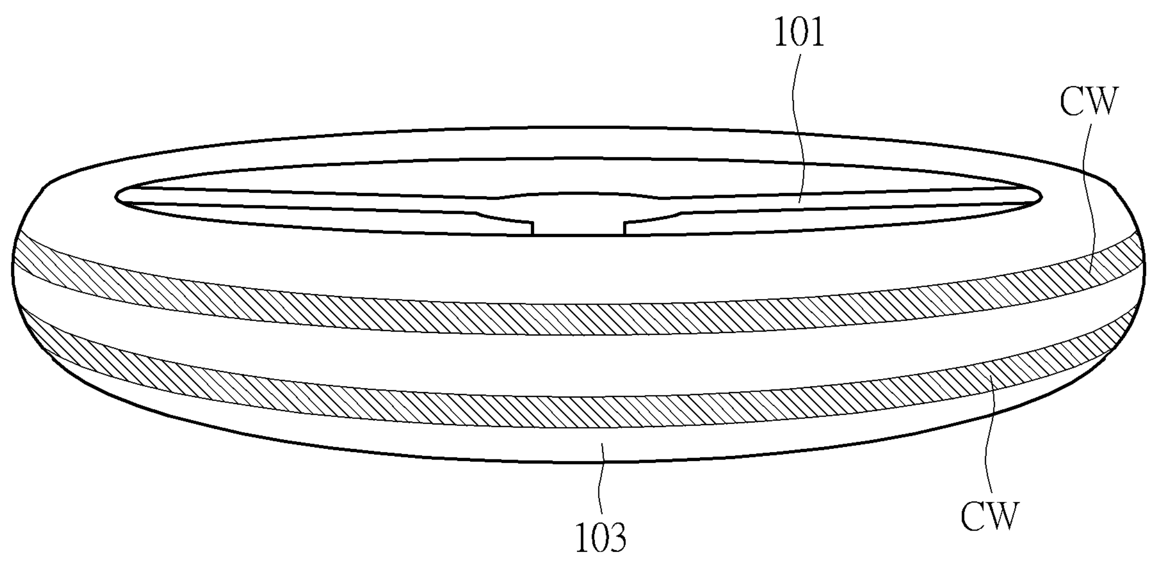
FIG. 6 and FIG. 7 are schematic diagrams illustrating steering wheels according to other embodiments of the present invention.
Figure 6:
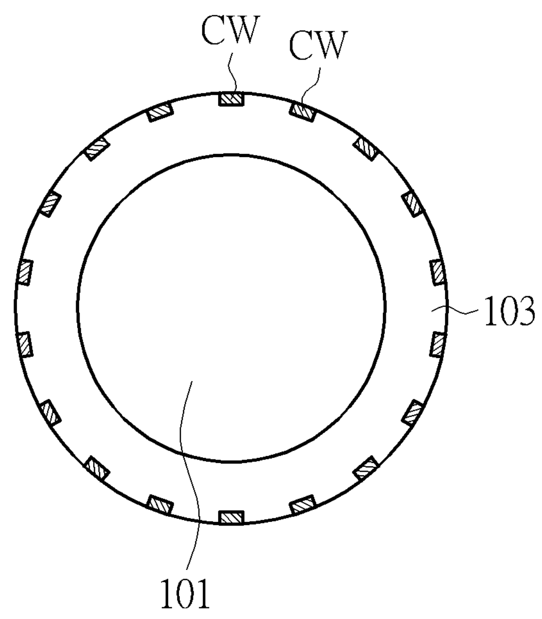
Figure 7:
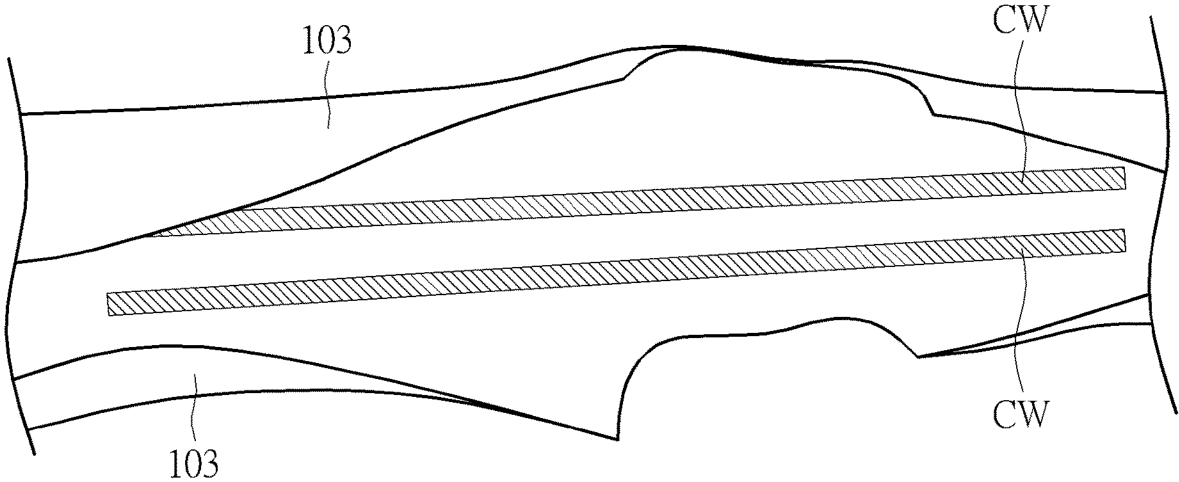
Figure 7:
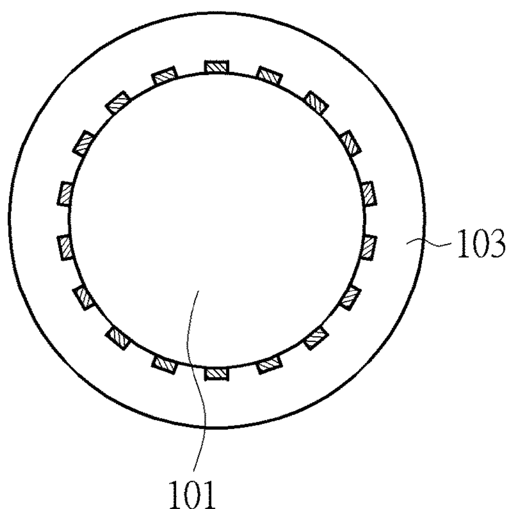

FIG. 6 and FIG. 7 are schematic diagrams illustrating a steering wheel according to other embodiments of the present invention. In these embodiments, the conductive wires CW are printed on the covering material 103. The two upper diagrams in FIG. 6 and FIG. 7 are appearance drawings of the covering material 103 and the conductive wires CW. Also, the lower diagrams in FIG. 6 and FIG. 7 are respectively cross sectional views of steering wheels shown in upper diagrams thereof, like the cross sectional view illustrated in FIG. 1. The conductive wires CW can be coupled to a capacitance detection circuit or a predetermined voltage level.

In the embodiment of FIG. 6, the conductive wires CW are printed on an outer surface of the covering material 103 which the user can directly touch. Please note the direct touch mentioned here can means physically direct touch, or the conductive wires CW are covered by a thin material layer thus the effect caused by the user while the user touching the thin material layer is almost the same as the effect caused by the physically direct touch. Therefore, if the conductive wires CW in FIG. 6 are coupled to a ground voltage, the grounding effect can be strong since the user can directly touch the conductive wires CW. Further, in the embodiment of FIG. 7, the conductive wires CW are printed between the frame work 101 and the covering material 103. In other words, in the embodiment of FIG. 7, the conductive wires CW are printed on an inner surface of the covering material 103 which touches the frame work 101. Accordingly, the covering material 103 can isolate external interference such as liquid when a user touches the covering material 103 to indirectly touch the conductive wires CW.

In one embodiment, the structures illustrated in FIG. 6 and FIG. 7 are mixed. For example, in one embodiment, a steering wheel which comprises the conductive wires illustrated in FIG. 6 and the conductive wires illustrated in FIG. 7 is provided. The conductive wires CW which have the structure illustrated in FIG. 7 are coupled to the capacitance detection circuit and the conductive wires CW which have the structure illustrated in FIG. 6 are coupled to the grounding voltage source.

Figure 8:
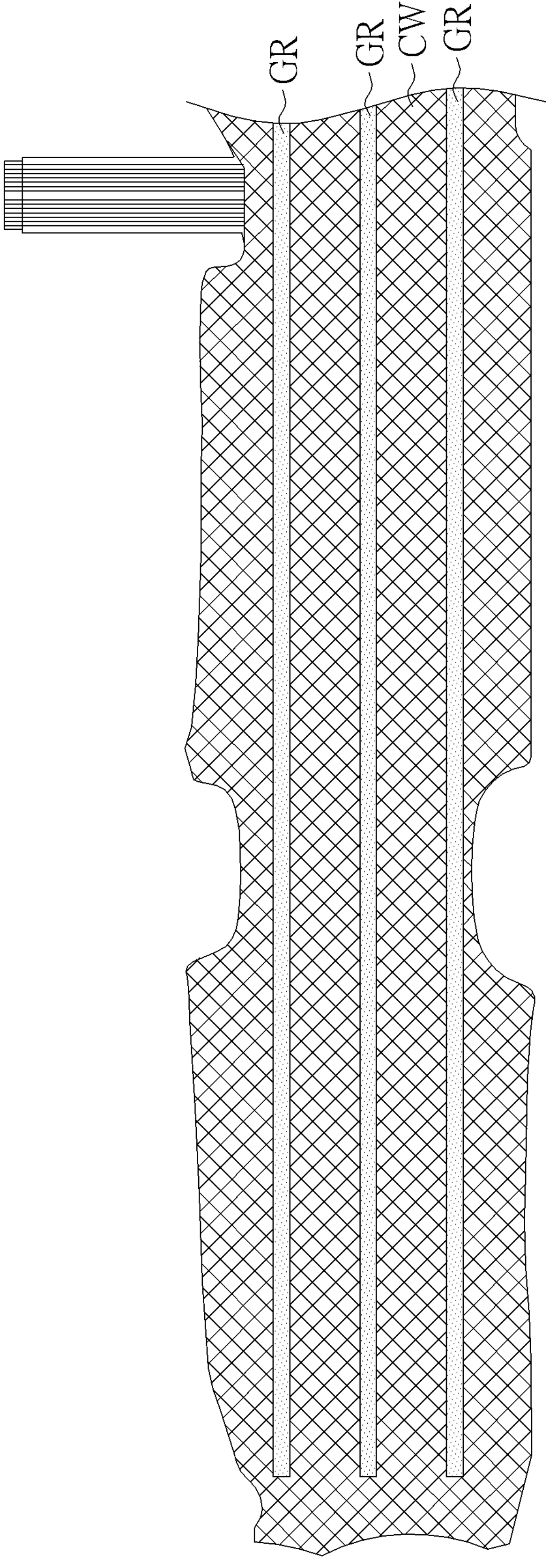
FIG. 8 and FIG. 9 are schematic diagrams illustrating that the sensing lines and at least one ground region are printed on the covering material.
Figure 9:
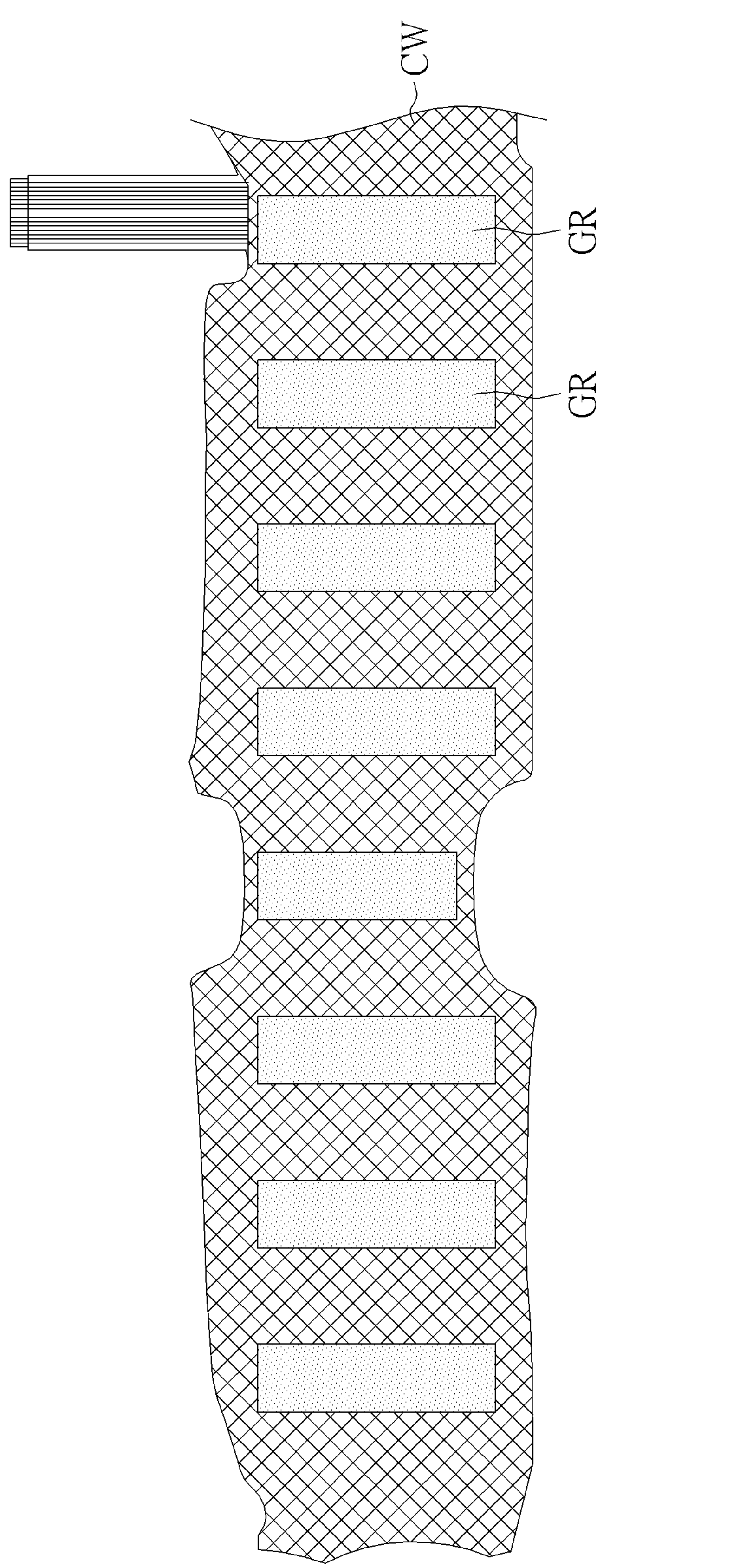

Besides the conductive wires CW, at least one ground region can also be printed on the covering material 103. FIG. 8 and FIG. 9 are schematic diagrams illustrating that the conductive wires and at least one ground region are printed on the covering material. In one embodiment, the conductive wires and the ground region illustrated in FIG. 8 and FIG. 9 are printed between the frame work 101 and the covering material 103. In other words, in the embodiment of FIG. 8 and FIG. 9, the conductive wires and the ground regions are printed on an inner surface of the covering material 103 which touches the frame work 101.

In the embodiment of FIG. 8, besides the conductive wires CW, the ground regions GR with elongated strip shapes are also printed on the covering material. Additionally, in the embodiment of FIG. 9, besides the conductive wires CW, the ground regions GR with rectangle shapes are also printed on the covering material. It will be appreciated that the arrangements of the conductive wires CW and ground regions GR are not limited to the examples illustrated in FIG. 8 and FIG. 9. In one embodiment, the conductive wires CW and the ground regions GR are printed on an inner surface of the covering material, such as the embodiment illustrated in FIG. 7.

For more detail, the structures illustrated in FIG. 8 and FIG. 9 can be regarded as sensor mats which comprise conductive wires CW and ground regions GR. If the sensor mat is applied for mutual capacitance touch sensing, the conductive wires CW serve as sensing lines and driving lines. If the sensor mat is applied for self-capacitance touch sensing, the conductive wires CW serve as sensing lines.

The ground regions GR can be coupled to a ground line in or on the covering material 103, such as the third thread Tr_3. By this way, a better grounding effect can be acquired since the user can touch the ground line in or on the covering material 103. Following the same rule, the conductive wires CW in the sensor mat, which serve as sensing lines, can be coupled to the sensing lines in or on the covering material 103, which serve as sensing lines. Further, the conductive wires CW in the sensor mat, which serve as driving lines, can be coupled to the driving lines in or on the covering material 103. Please note, the sensor mats can be components independent from the covering material 103 rather than limited to be printed on the covering material.

In view of above-mentioned embodiments, the arrangements of the conductive wires can be changed corresponding to the size or the shape of the frame work or any other requirements. Besides, the interference caused by unstable factors can be improved since the conductive wires can be coupled to a ground source of the vehicle to provide a short capacitance sensing path.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An HOD (Hand Off Detection) device, comprising:
- a framework;
- covering material, covering the frame work and comprising different pieces of covering material;
- at least one conductive region, comprising at least one thread which stitches the pieces of covering material, wherein the thread is a conductive wire coupled to a capacitance detection circuit or a predetermined voltage level, wherein the capacitance detection circuit detects capacitance variation and the predetermined voltage level is a ground source;
- wherein the conductive region outputs a first capacitance if a user touches the conductive region and outputs a second capacitance if the user does not touch the conductive region;
- wherein the capacitance detection circuit detects the capacitance variation based on the first capacitance and the second capacitance.

2. The HOD device of claim 1, wherein the conductive region comprises:
- a first thread, provided in the covering material;
- a second thread, provided in the covering material;
- a third thread, provided in the covering material, comprising at least one bent part configured to hook the first thread and the second thread;
- wherein at least one of the first thread, the second thread and the third thread is served as the conductive wire.

3. The HOD device of claim 2, wherein the first thread and the second thread are coupled to the predetermined voltage level.

4. The HOD device of claim 2, wherein the first thread and the second thread are coupled to the capacitance detection circuit.

5. The HOD device of claim 2, wherein one of the first thread and the second thread is coupled to the predetermined voltage level, and the other one of the first thread and the second thread is coupled to the capacitance detection circuit.

6. The HOD device of claim 2, wherein the third thread is served as the conductive wire.

7. A vehicle control device, applied to a vehicle, comprising:
- a framework;
- covering material, covering the frame work and comprising different pieces of covering material;
- at least one conductive region, comprising at least one thread which stitches the pieces of covering material, wherein the thread is a conductive wire coupled to a capacitance detection circuit or a predetermined voltage level;

wherein the capacitance detection circuit detects capacitance variation and the predetermined voltage level is a ground source;

wherein the conductive region outputs a first capacitance if a user touches the conductive region and outputs a second capacitance if the user does not touch the conductive region;

wherein the capacitance detection circuit detects the capacitance variation based on the first capacitance and the second capacitance.

8. The vehicle control device of claim 7, comprising:

a first thread, provided in the covering material;

a second thread, provided in the covering material;

a third thread, provided in the covering material, comprising at least one bent part configured to hook the first thread and the second thread;

wherein at least one of the first thread, the second thread and the third thread is served as the conductive wire.

9. The vehicle control device of claim 8, wherein the first thread and the second thread are coupled to the ground source.

10. The vehicle control device of claim 8, wherein the first thread and the second thread are coupled to the capacitance detection circuit.

11. The vehicle control device of claim 8, wherein one of the first thread and the second thread is coupled to the ground source, and the other one of the first thread and the second thread is coupled to the capacitance detection circuit.

12. The vehicle control device of claim 8, wherein the third thread is served as the conductive wire.

13. The vehicle control device of claim 7, wherein the vehicle control device is a steering wheel.

* * * * *